Sept. 2, 1958 W. S. OLIWA ET AL 2,850,720

DATA RECORDING AND PLAYBACK DEVICE

Filed Nov. 9, 1951 3 Sheets-Sheet 1

INVENTORS
HOWARD M. FLEMING, JR.
WALTER S. OLIWA

BY William L. Glover

AGENT

DATA RECORDING AND PLAYBACK DEVICE

Filed Nov. 9, 1951 3 Sheets-Sheet 2

INVENTORS
HOWARD M. FLEMING, JR.
WALTER S. OLIWA
BY William S. Slover
AGENT

Sept. 2, 1958 W. S. OLIWA ET AL 2,850,720

DATA RECORDING AND PLAYBACK DEVICE

Filed Nov. 9, 1951 3 Sheets-Sheet 3

INVENTORS
HOWARD M. FLEMING, JR.
WALTER S. OLIWA
BY William L. Glover
AGENT

United States Patent Office 2,850,720

Patented Sept. 2, 1958

2,850,720

DATA RECORDING AND PLAYBACK DEVICE

Walter S. Oliwa, Summit, and Howard M. Fleming, Jr., Orange, N. J., assignors to Monroe Calculating Machine Company, Orange, N. J., a corporation of Delaware Application November 9, 1951, Serial No. 255,644

13 Claims. (Cl. 340—174)

This invention relates to data recording and playback devices and is a continuation in part of prior application #196,154, filed November 17, 1950, and now abandoned. A system is herein disclosed having as its primary purpose to record pulses on certain channels of a magnetic drum in response to the actuation of a keying device of any suitable type, say the keyset of an adding machine, for example. The method employed is one wherein different items of information are recorded linearly along one of said channels in response to the actuation of the keying device. This method lends itself to the use of a 10-key keyboard for entering numerical items one at a time into a serial array of code signal recordings on the drum. The keyboard operator may work at a variable rate of entering successive items, while the spacing of the separate entries on the recording track is uniform and is governed with a high degree of precision. The information is held in storage on the magnetic drum until called for. It may then be played back at a synchronized cadence into any suitable utilization device, such, for example, as another component of an electronic computing machine.

The invention, as exemplified herein, enables numbers to be recorded serially on the drum in response to code signal keying at any rate which does not exceed one item per revolution of the drum. The recordings are transferable from one to another channel for a purpose presently to be explained. The information, instead of being introduced into the drum record by means of a manipulatable keyset, could be derived from punched cards, from perforated tape, or from any other suitable source that supplies information in serial form.

The items of data are reduced to code signals, different permutations of the elements being representative of numerical digits or letters of the alphabet. In the embodiments herein shown and described numerical significance of the code signals will be understood. It is preferable, also, to represent each of the ten digits of a number by means of a four-unit code signal. Such signals and the method chosen for recording and playback of the same will presently be described as contributing to the efficient operation of an electronic computer.

It is an object of this invention to provide electronic gating equipment in association with recording and playback devices whereby coded information may be introduced into a magnetic recorder at a variable rate per item entry and stored therein until such time as the information can be utilized.

A further object is to provide a system for storing numerical or other statistical data, means being incorporated into the system for synchronizing the pulse recording process with a fixed readout rate which is suitable for use in connection with high-speed electronic computer techniques. This system, despite the high speed of entering code pulses into a magnetic storage member is adapted to be controlled by a manipulatable keyset or other keying device having a relatively slow cadence.

Other objects and advantages of this invention will become apparent in the description to follow. This description is accompanied by a drawing in which.

*Brief description*

Figure 1:
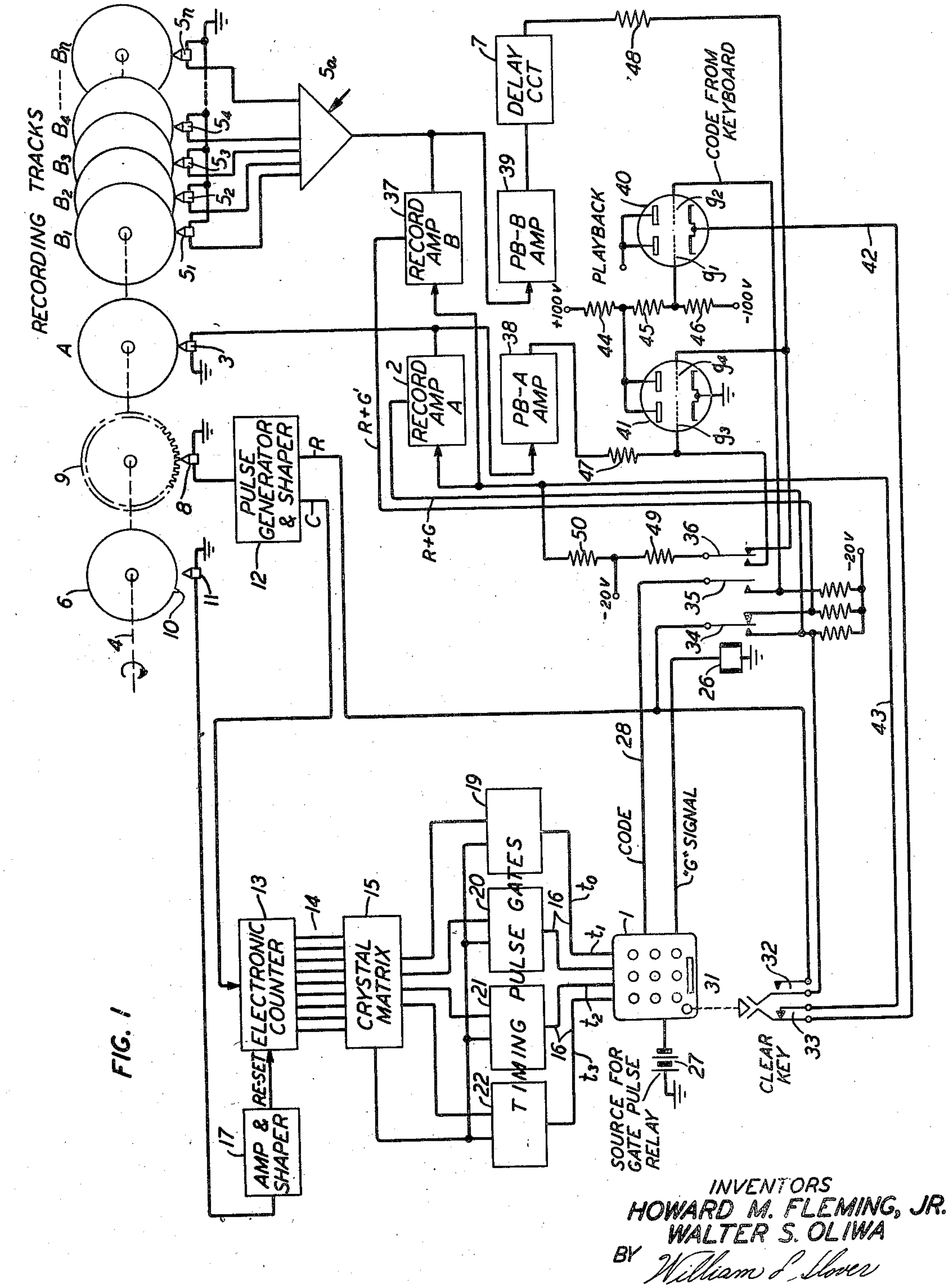
Fig. 1 is a circuit diagram showing the principal components of a device which exemplifies the invention in one form.
Figure 3:
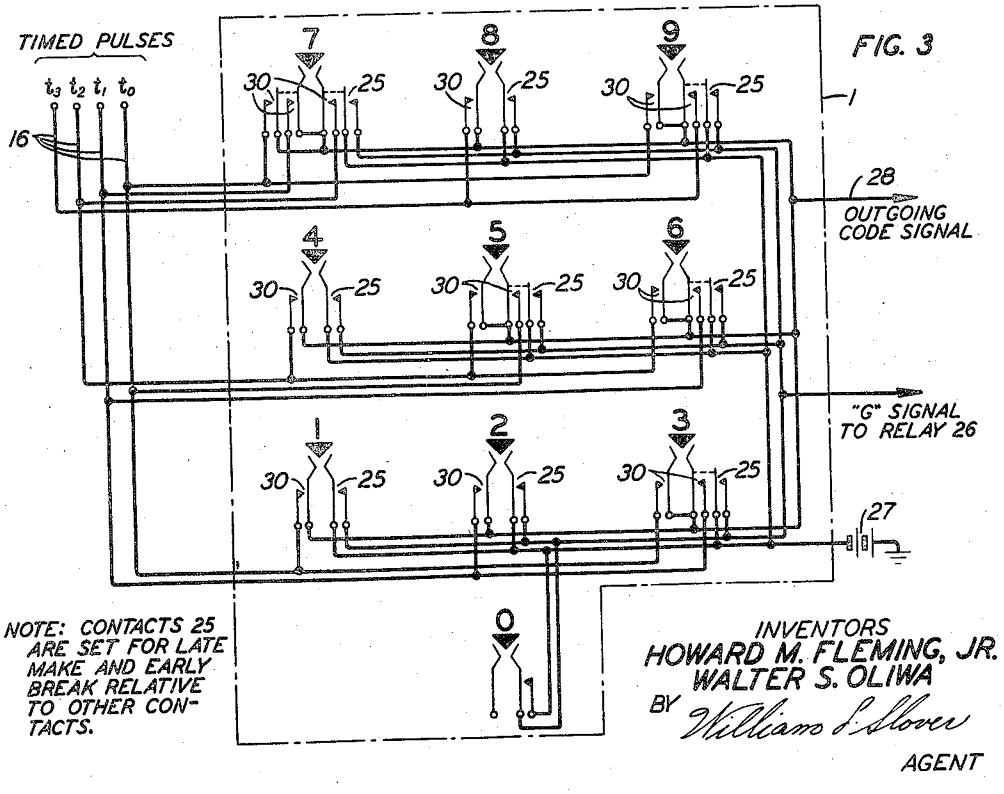
Fig. 3 shows a preferred circuit arrangement whereby permuted code signals are composed in response to the manipulation of a 10-key numerical keyboard.

Before going into minute details of description, a brief summary of the nature of this invention and its mode of operation will be given:

A keyset 1, Figs. 1 and 3, is of the conventional 10-key type and is provided for manipulation when recording numbers. Each key has contacts whereby a sequence of pulses may be selected for code representation of the numeral which it represents. The depression of each key also transmits a start or "G"-signal for effecting a gating operation. The code elements of the signals are gated through a recording amplifier 2 the output from which is used to excite a recording head 3 and thus to impress spot magnetizations on one recording track A of a continuously revolving drum.

For reasons presently to be given, the record made on recording track A is read out (without erasure) and is thereupon recorded by a recording head 5 on a second recording track B of the same drum. The code signals occupy predetermined angular positions or sectors on the drum, due to the synchronizing arrangements. When a succession of key operations is performed, each code signal becomes recorded in a distinct sector linearly of the recording track B, although a multi-element signal may be superposed on a signal that was previously recorded in the same sector on track A.

Preferably, recording path B may be any one of several recording paths, $B_1, B_2, \ldots, B_n$, each of which has its own recording head $5_1, 5_2, \ldots, 5_n$ as shown in Fig. 1. The several recording heads $5_1, 5_2, 5_n$ are selectively connectable with record amplifier B for energization thereby, through the medium of a selector circuit $5_a$ which may consist of a relay matrix controllable by a suitable selector switch on the keyset. The said selector switch and the details of selector circuit $5_a$ are not shown and will not be described as they are extremely well known in the art and do not form a material part of the invention.

The transfer of recordings from track A to track B and back again to track A in another sector is accomplished, in one form of the invention, by means of a delay circuit whereby precession is obtained so as to enable a multi-digit record to be made, and in another form of the invention by direct coupling, the precssion being effected by the delay, between the recording and playback of signals on each track. This record remains on one track (A) as long as is wanted and can be utilized in various ways in an electronic computer, and repeatedly if desired. The more detailed description now follows.

The tempo, or cadence, of pulse recording is governed by timing pulses which have a predetermined frequency and are derived from the excitation of a reading head 8 by means of a toothed magnetic wheel 9 mounted on the same shaft with the magnetic drum. The axial length of the drum accommodates any suitable number of annular magnetic recording paths.

The axis of the drum and wheel 9 is referenced 4. Continuous rotation of these members may be had by means of a motor, not shown. Mounted on the drum shaft is a disk 6 having a magnetic element 10 which produces a single pulse per revolution when sensed by a pick-up head 11. The mechanical aspects of the drum are conventional, as is the use of a thin coating of magnetic material on the periphery of a non-magnetic cylindrical rotor. The details of construction are well known in the art; for example, reference is made to Patent #2,540,654 to Cohen et al.

The pick-up head 8 supplies pulses, usually of sine-wave character, which must be converted into substantially square-wave formation, and preferably, having shorter pulse duration than the intervening space intervals. By resorting to electronic circuit techniques well known in the art, the pulse generator and shaper unit may be caused to deliver two or more trains of short sharp timing pulses. The pulses of one train lag somewhat behind those of the other train. The phase difference between the pulses of one train and those of the other is easily adjusted by well known means. Here it is required that each of the so-called C-pulses shall precede an R-pulse by a predetermined time interval which will allow for stabilization of certain trigger tubes in an electronic counter 13 before transmitting the R-pulses to the several gating devices. The means for generating the R-pulses is suitably designed to give them extremely short duration and to have them suitably phased so that the recording of magnetization spots on the drum shall be well defined and accurately placed along the recording track.

*The electronic counter*

The C-pulses are used to drive an electronic counter 13 of conventional type; one comprising a series of twin-triode trigger tubes is preferred. The binary system of pulse counting is used so that each count represents a binary number and is reflected in a different permutation of high and low voltages on digital conductors 14 which stem from the output circuits of different trigger pairs in the electronic counter 13. Conductors 14 lead to a crystal matrix 15, also well known in the art, and serving to deliver one pulse at a time and in sequence to different ones of a plurality of output circuits $t_0$, $t_1$, $t_2$ and $t_3$. The counting cycle could be such as to differentiate between the pulse transmission times of many more output circuits than those shown leading out of the matrix 15, but five are sufficient for the requirements of the present system. Four of the pulse circuits lead respectively to different timing pulse gates, 19, 20, 21 and 22, and thence to the contacts of certain keys in the keyset 1. A fifth pulse circuit operates in a negative manner.

In an embodiment of this invention which has a capacity for recording coded decimals, say twenty, it is necessary to provide 80 spot positions linearly of the recording tracks A and B. The number of such spot positions and the number of teeth in the synchronizing pulse wheel 9 may be greater than 80, however, say 180, in order to allow time for the generation of other signals, commonly called "instructions" and for other reasons to become apparent hereinafter. The electronic counter 13 is arranged to count the teeth in gear 9 during each full revolution and to be reset by a reset pulse which is obtained as follows:

The pick-up head 11 is suitably positioned to sense the passage across its pole-piece of the single tooth 10 on disk 6. A pulse is thereby generated and is amplified and shaped into a short sharp trigger pulse by means of an amplifier and shaper unit 17. The duration of the reset pulse is such as to cause all stages of the counter circuit to be zeroized, so as to start a new count at the beginning of every drum revolution. The repetition rate of the counting sequence is, therefore, maintained in a 1 to 1 ratio with respect to the revolutions of the coaxial members 6, 9, and the A and B channels of the magnetic drum.

*The diode matrix*

A crystal diode matrix 15, well known in the art, is provided for the purpose of individually distributing four sequentially generated timing pulses to circuits labeled $t_0$, $t_1$, $t_2$, and $t_3$ according to the sequence necessary for recording each four-unit code signal. These timing pulses are the first four to be generated following the resetting of the counter 13. The counter continues to register numbers up to the limit fixed by the number of teeth in the gear wheel 9, but the matrix 15 is arranged to deliver only the four pulses at times $t_0$, $t_1$, $t_2$, and $t_3$.

Figure 2:
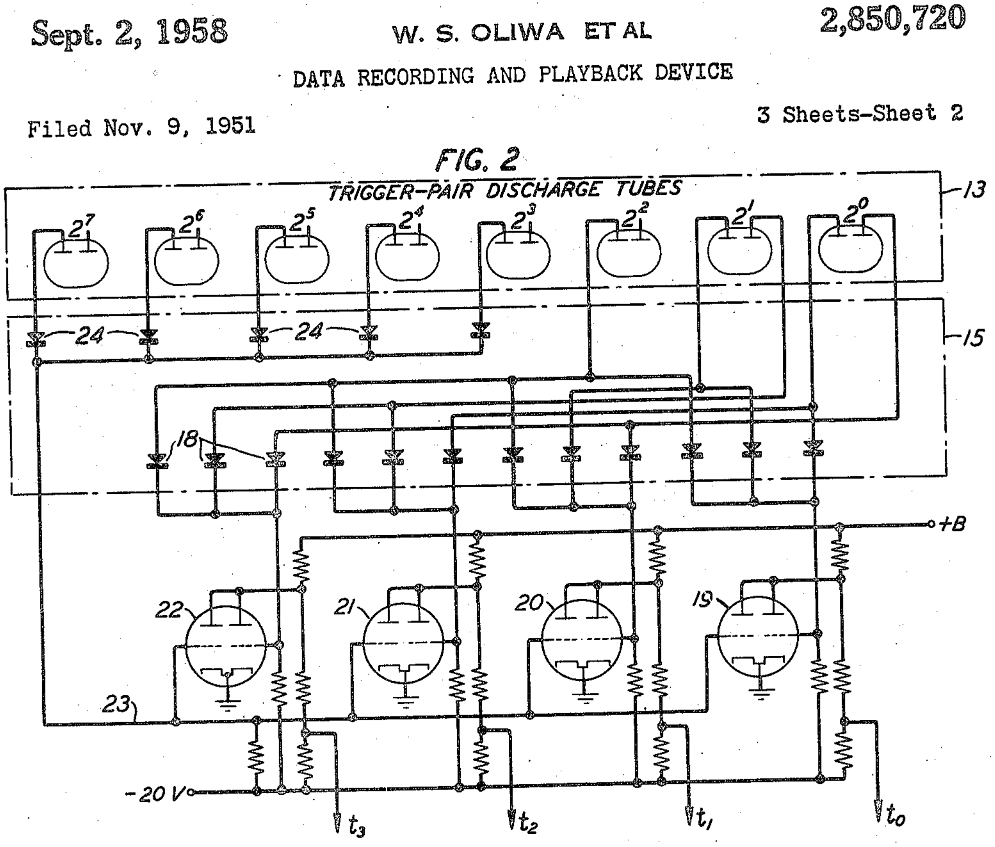
Fig. 2 is another circuit diagram showing certain details of an electronic counter in association with a matrix and a sequential distributor of pulses.

Referring to Fig. 2 the operation of the counter and associated crystal matrix will now be explained. The counter 13 on each revolution of the pulse wheel 9 will here be assumed to count from 0 to 179. On the 180th pulse it will be reset by a dominating pulse from the amplifier and shaper unit 17. It will be convenient hereinafter to call this 0–179 count a "complete drum cycle," this distinguishing from a rotation of the drum starting at any intermediate time. This counting cycle requires a complement of eight binary digit stages of electronic units which can, for example, be constituted as trigger pair tubes or the equivalent. These are shown conventionally in Fig. 2 and are labeled (reading from right to left), $2^0$, $2^1$, $2^2$, $2^3$, $2^4$, $2^5$, $2^6$ and $2^7$. Units $2^0$ and $2^1$ have two output conductors each leading from a respective one of the anodes of a trigger pair, or twin triode discharge device. Preferably, although not shown in the drawing, the digital stages of the counter each comprise one or two cathode follower tubes which deliver high voltage and low voltage outputs corresponding to the fluctuations of anode potential of the trigger pair by which they are controlled.

The counter units for digits $2^0$ and $2^1$ have two output circuits each, while the remaining digital units have one output circuit each, leading from the anode (or cathode follower) on the left side of the trigger pair.

The following arbitrary assumptions are to be noted in further description of Fig. 2:

(1) When a trigger pair registers the binary number "0" its left side is conductive; thus producing a low anode potential on the left side.

(2) If a cathode follower tube is controlled by the left side anode; then the cathode of this follower tube will be driven positive and will deliver a positively polarized pulse to its output circuit for indication of the digit "1."

(3) When a trigger pair registers the binary digit "1" its right side is conductive so that the associated cathode follower tube will have a negative potential on its grid and a corresponding negative potential on its cathode. If such cathode potential is equal to the potential at the other end of its output circuit no current will flow therein.

(4) Output leads from the left sides of the trigger pair counting stages always have potentials which are high when the right side potential is low; and low when the right side potential is high.

(5) The showing in Fig. 2 of unidirectional conductance elements 18, such as crystal diodes or the equivalent should be interpreted to mean that electron flow from the cathode to the anode is upward when the upper terminal is the more positive, and flow ceases when the potentials of the diode terminals are equal.

*Timing pulse utilization*

Now the first four counts shown by the counter 13 are registered as binary numbers thus:

(1) $00000000 = t_0$ (2) $00000001 = t_1$ (3) $00000010 = t_2$ (4) $00000011 = {}_3$

The four gate tubes 19, 20, 21 and 22 are constituted as twin triodes, the left hand sections of which are all controlled by the potential on a common input circuit 23. Counter stages $2^3$, $2^4$, $2^5$, $2^6$ and $2^7$ have connections from their left hand anodes (or cathode followers) through individual crystal diodes 24 to the conductor 23. From the eighth count up to the end of the counting cycle $2^n$, one or more of these higher order counting stages will register a binary "1" and will have a high anode potential on the left side. This results in current flow through one or more of the diodes 24 and causes all of the left-hand triode sections of tubes 19, 20, 21 and 22 to be conductive. Under such conditions these tubes will deliver low output potentials to the utilization circuits labeled $t_0$, $t_1$, $t_2$, and $t_3$, as is desired.

The counter stage $2^2$ has a connection from its left-hand anode (or cathode follower) which is branched through different ones of the crystal diodes 18 to right-hand input circuits of the gate tubes 19, 20, 21, and 22. Consequently, these gate tubes will have right side conductance whenever the left side of counter tube $2^2$ is cut off, for registering the binary digit "1." That is to say, the function of counter stage $2^2$ is supplemental to the function of the higher order stages in that it prevents delivery of positive counting pulses by the gate tubes during the four counting pulses following the fourth pulse $t_3$.

It would be possible to connect the left-hand anode (or cathode follower) of counter stage $2^2$ through just one additional crystal diode 24 and thence to conductor 23, instead of connecting it through branches that include separate crystal diodes 18 leading to different right-hand grids in the gate tubes 19–22 inclusive. So far as the operation of this invention is concerned the results would not be changed by this modification and there would be a reduction by three in the number of crystal diode elements. The arrangement shown in the drawing is, however, one that provides for the differentiation of counts $t_4$, $t_5$, $t_6$ and $t_7$, these counts being useful in the operation of certain components of a computer other than those with which this invention is concerned.

The gate tubes 19, 20, 21 and 22 areadapted each to deliver a positive timing pulse in response to the blocking of both its triode sections simultaneously. Thus, the four timing pulses which are required for the operation of this system are derived and subsequent pulses are suppressed according to the following table where H and L refer to grid potentials as high or low and on left or right sides of the twin triode gate tubes, and V indicates variation of grid potential with no useful effect. Both grids of the gate must be simultaneously low in order to obtain a high anode potential for a useful output pulse:

| Count | Tube 22 | Tube 21 | Tube 20 | Tube 19 |
|---|---|---|---|---|
| $t_0$ | LH | LH | LH | LL |
| $t_1$ | LH | LH | LL | LH |
| $t_2$ | LH | LL | LH | LH |
| $t_3$ | LL | LH | LH | LH |
| $t_4$–$t_7$ | LH | LH | LH | LH |
| $t_8$–$t_n$ | HV | HV | HV | HV |

*The keyset*

The keys of a conventional ten-key keyboard 1 (Fig. 1) are provided with contact pairs as shown in Fig. 3. Depression of each key closes one pair of contacts 25 for transmission of a gating control signal, hereinafter called the "G-signal." Contacts 25 must be "late-make-early-break" in order to start the function of the G-signal subsequent to the closure of the code composing contacts on any key, and to terminate the period of the G-signal before opening the code composing contacts. For the operation of relay 26, power is supplied from a suitable source 27. Other contacts 30 of each key are paired for the purpose of selecting different ones of the timing pulses to be transmitted over an outgoing signal conductor 28. The four conductors 16 are output leads from gates 19, 20, 21 and 22, and each of these conductors carries a timed pulse of the sequential series $t_0$, $t_1$, $t_2$ and $t_3$.

The contacts of the keyset 1, when selectively closed by key manipulation, produce code signals which conform to an accepted, but arbitrary representation of the ten cardinal digits, thus:

| Numeral | $t_3$ | $t_2$ | $t_1$ | $t_0$ |
|---|---|---|---|---|
| 0 | | | | |
| 1 | | | | P |
| 2 | | | P | |
| 3 | | | P | P |
| 4 | | P | | |
| 5 | | P | | P |
| 6 | | P | P | |
| 7 | | P | P | P |
| 8 | P | | | |
| 9 | P | | | P |

The letter P in the above table indicates a "mark" or the presence of a high potential output pulse at the times $t_0$, $t_1$, $t_2$ and $t_3$ as switched through by any key depression, the timing of the same being controlled by the gates 19, 20, 21 and 22. The word "high" in the preceding sentence can be taken for example as 0-volts in contrast with −20 volts which would be taken to represent the "space" elements of each code signal. The particular code shown in the above table corresponds with binary digit notation, but other codes may be used if preferred.

The keyset is provided with a "clear" key 31, which should be depressed before recording any new series of items or digits on the magnetic drum. The clearing function will be explained following a description of the recording and playback gates.

*The "G"-signal*

Whenever a numeral key of the keyset 1 is depressed, closure of its contact 25 (Fig. 3) causes relay 26 (Fig. 1) to operate, as previously explained. Three functions are thereat performed:

(1) Transfer contact 34 establishes a connection for delivering the R-pulses to an input circuit $R+G$ for obtaining a recording pulse output from the recording amplifier 2. In the absence of the G-signal (that is, with relay 26 restored to normal) the R-pulses are fed only to an input circuit $R+G'$ of recording amplifier 37, which thereby operates alternatively with respect to amplifier 2.

(2) Closure of contacts 35 establishes connection from the keyset and its code signal output conductor 28 to grid $g_2$ in tube 40, this being a dual-control gate tube presently to be described.

(3) Transfer contact 36 shifts a −20 volt bias potential from the grid $g_4$ to grid $g_3$ in a dual-control gate tube 41, also presently to be described. The performance of these three functions will be understood in the ensuing description to be initiated by the G-signal, and is continuous during as many revolutions of the drum as may occur during key depression time. Repetitious recordings are not necessary, but there is no objection to them and there is no need to avoid them. Other functions are to be performed, however, as soon as the key is released. They are initiated by a so-called G′-signal, which merely represents the absence of the G-signal and is always present when no key is depressed.

*The recording and play-back amplifiers*

The recording amplifier 2 is labeled "Record Amp. A" because it serves the magnetic head 3 for Channel A. All code signals originated at the keyset 1 are applied through gate 40 and amplifier 2 to recording head 3, this recording being without any phase displacement. The amplifier 2 is suitably designed according to well known techniques for responding to mark-space signals as delivered by a circuit shown entering the left side of the diagrammatic block, provided that they are gated through the amplifier in response to $R+G$ signals entering at the top side of the block. In the presence of an $R+G$ recording pulse the output will be of one polarity when the amplifier is conditioned to transmit a mark element of the code signal. A recording pulse of opposite polarity is likewise transmitted to represent a space signal. Application of pulses of one or the other polarity to the recording head 3 insures erasure of all remnants of previously recorded signals on the same track.

The code signals are fed simultaneously to the input circuits of the two recording amplifiers 2 and 37 but, as will now be explained, amplifier 37 does not respond to signals which are transmitted from the keyset. The recording amplifier 37 is structurally a duplicate of amplifier 2, but is subject to gating of the input signals only in the presence of the $R+G'$ signal. That is to say, when a key of the keyset 1 has been released, any playback of the record that appears on Channel A will be transcribed on Channel B, but after amplification and gating through the amplifier unit labeled "Record Amp. B."

The playback amplifier 38 is labeled "PB–A Amp." to signify its function in amplifying readout signals coming from the A-channel head 3, considered to be operative as a pick-up head. Playback amplifier 39 is labeled "PB–B Amp." for the same reason, being associated with the pick-up head 5 and the B-channel.

It should be noted that the one circuit through each of the recording-and-playback heads is permanently connected both to the output side of a recording amplifier and to the input side of a playback amplifier. This arrangement has been found to be practicable and it avoids switching.

*The recording and playback gates*

The gate tubes 40 and 41 are preferably of the twin triode type. Each of these tubes has its two cathodes interconnected and, too, its anodes are interconnected. Tube 40 opertaes as a cathode follower, while tube 41 has an output circuit connected to grid $g_1$ in tube 40. Grid $g_2$ in tube 40 is controlled by the keyset when relay 26 is operated by the G-signal, to close its contacts 35.

There are two stages of gate tube operation to be considered, the first being initiated by the G-signal when any one of the numeral keys is depressed, and the second stage when that key is released. This second stage of operation accompanies the automatically derived G'-signal.

During the first stage the code signal as set up on the keyset 1 is applied through conductor 28 and closed contacts 35 of relay 26 to grid $g_2$ in gate tube 40. The mark elements of the code signal, being positive, cause conduction in the right-hand section of tube 40 and its cathode is driven positive. The space elements of the code signal render the right-hand section of tube 40 non-conductive. The grid $g_1$ is also maintained at a cut-off bias by a conductive state of the right side of tube 41, this, in turn, being due to the fact that the output from delay circuit 7 during pulse times $t_0$, $t_1$, $t_2$, $t_3$ is a constant positive potential not counteracted upon by the —20 volt biasing source; so that grid $g_4$ in tube 41 is held positive. Note that the circuit from the —20 volt source terminal is extended through resistor 49 to contact 36 of relay 26. The G-signal being present, the —20 volt bias is applied only to grid $g_3$ for suppression of any positive pulses that may emanate from the playback amplifier 38 during this first stage. Therefore, the positive potential from the delay circuit 7 is in full control of grid $g_4$ and holds the latter's section of tube 41 conductive, the resultant low anode potential, in turn, being effective to hold grid $g_1$ in tube 40 below cut-off.

The speed of the magnetic drum is such that it is practically impossible to manually release a key of the keyset before the drum has made at least two revolutions. This fact not only makes it possible to utilize the period of the G-signal during the counts $t_0$, $t_1$, $t_2$, and $t_3$ of the timing pulses for recording numbers as selected by the keyset; but, furthermore, during subsequent counts while the G-signal persists, the playback amplifier 39 and delay circuit 7 become effective in transcribing onto recording track A whatever information may happen to be stored in recording track B. It will be noted, however, that only one complete cycle of the drum as defined above is required for this purpose. This recording operation is performed by applying the readout signals through resistor 48 to grid $g_4$ in tube 41.

If the record on track B had been erased by use of the clear key 31 just prior to the recording of the first digit on track A, then the output from delay circuit 7 would be a continuous succession of positive pulses, representing zeros. If the second digit of a number is recorded on track A during a G-signal interval, then the simultaneous playback from track B of the first digit will be delayed by four pulse times in the delay circuit 7 and will be responded to by grid $g_4$ in tube 41 where, as previously explained, a conductive state represents "0" and a non-conductive state represents "1." Grid $g_1$ in tube 40 causes its tube to be non-conductive to represent a "0" and conductive to represent "1," and this tube being a cathode follower delivers code pulses through conductor 42, contacts 33 of the clear key 32, and conductor 43 to the record amplifiers 2 and 37. But amplifier 2 alone responds because its output pulses occur only when the $R+G$ input circuit delivers timing pulses for spot recording on track A. Thus, a series of digits of a number may be recorded on track A, using the 4-unit code for each digit.

Upon release of the actuated key in keyset 1, relay 26 is restored, thus presenting the G'-signal which characterizes the second stage of gate tube operation. The —20 v. bias potential through resistor 49 and contact 36 is held connected to grid $g_4$ so that output pulses from delay circuit 7 will have no controlling effect. Now tube 41 responds only to code signals which are applied to its grid $g_3$, this grid being held at a normal 0-volt bias in representation of a space code element ("0") and being driven to —20 v. cut-off bias in representation of a mark code element ("1"). The code signals are derived from the playback amplifier 38 which responds to the readout function of the head 3 scanning the recording track A. The effect on tube 40 is to control its grid $g_1$ while its grid $g_2$ is held below cut-off.

It should be observed from the above that successive key operations result in first recording the several digits of a number all superimposed one upon another in the first four code element positions along track A. Also each recording of a digit effects a wipeout of the previously recorded digit, but only after the same has been transcribed on track B. Then each playback from track B is delayed by the delay circuit 7 so that the record is precessed upon its subsequent recording on track A. For example, depressing first a three key and then a four key effects recording of the code representation of "3" on track A at times $t_0$–$t_3$ of a cycle following the first key depression, the shifting of this recording to track B, and finally, the recording on track A of the code representation of "4" at times $t_0$–$t_3$, and "3" at times $t_4$–$t_7$ of a cycle following the second key depression. Of course, the entire recording is then shifted to track B.

The differentiating effects of the mark-space code element signals are to be understood as of longer duration that the R-pulses. The latter are of the order of microseconds so as to very precisely locate each spot recording of a code element. The amplifiers 2 and 37 are preferably each composed of two parallel-connected circuits one of which includes an inverter stage so as to be capable of delivering output pulses of reversible polarity. Each of the separate circuits has two input terminals one of which receives the code element control pulses and the other of which receives the R-pulses. Both are essential to the delivery of a recording pulse. The "mark" signal recording is made by output from one of the two parallel circuits when conditioned by a positive pulse from the cathode of tube 40. The "space" signal recording is made by an output from the other of the two parallel circuits, namely, the one having an inverter stage, when conditioned by a negative pulse from the cathode of tube 40, the latter being non-conductive.

*The precession of multi-digit recordings*

The foregoing description of operation may be summarized by pointing out that each group of four spot areas along Channel A, or at least a group for each digit of a number to be recorded, eventually receives a recording of a selected code signal. The entire array of code signals for a plural digit number is then shifted to and stored linearly along the magnetic recording track B. The code signals for any number of digits are precessed step by step as they are recorded. The initial recording of each successive 4-unit code signal is at the front end of the recording track because it is always gated through from the keyset to the recording head 3 at times $t_0$, $t_1$, $t_2$, $t_3$.

The transfer of each successive 4-unit code signal from Channel A to Channel B is for the purpose of retaining these items as introduced by the keyset. This transfer is accomplished without suffering any phase departure, or loss of synchronism respecting the cycles of rotation of the drum.

*The function of the clear key*

The use of any storage device in a computer obviously requires that previously stored items in the storage medium must be blanked out before introducing a new item. In the presently described system the clear key 31 performs this function. Manipulation of this key closes one pair of contacts 32 and opens another pair 33. Wipe-out of the entire record in both Channels A and B is, therefore, assured. The wipe-out process is explained as follows:

Relay 26 is not operated. The gating pulses R are fed through contact 34 and its back contact to the conditioning circuit $R+G'$ which enables the recording amplifier 37 to function pulsatively. The −20 v. source terminal is permanently connected through a resistor 50 to this timing pulse circuit and serves as a normal −20 v. biasing base from which the R-pulses rise to an above-cut-off level. The gate tube 40 is disabled by the open contacts 33 of the clear key, the cathode circuit of tube 40 being thereby isolated from the input circuit (conductor 43) which is common to the recording amplifiers 2 and 37. The blocking bias −20 v. which is fed through resistor 50 is effective, however, to condition the proper one of the two parallel circuits in amplifier 37 so that the R-pulses will deliver recording signals of spacing significance to the recording head 5, these pulses having a polarity which signifies the recording of zeros.

The wipe-out process respecting Channel A is made concurrent with the above described process respecting Channel B. This is accomplished by the closure of contacts 32 on the clear key. The effect is to transmit the R signal to the $R+G$ conductor leading to the top side of the diagrammatic block representing the recording amplifier 2 which is operatively associated with Channel A. Now this control circuit has a resistive connection to the −20 v. source terminal and the bias so introduced makes selection of the proper one of the two parallel circuits in amplifier 2 so as to give the output from this amplifier a suitable polarity to record R-pulses of zero significance over the entire length of Channel A.

*Review of the steps of operation*

Channels A and B having been cleared by the use of the clear key 31, the highest order digit of a new number to be recorded will be selected by depression of one of the keys in the keyset 1. As soon as relay 26 can be operated, the code signal composed of permutationally arranged timing pulses $t_0$, $t_1$, $t_2$ and $t_3$ is transmitted through conductor 28, relay contacts 35, and thence to grid $g_2$ in gate tube 40. The mark elements of the code signal overcome the normal negative bias on this grid and cause the cathode in this tube to be driven positive. The space elements of the code signal leave grid $g_2$ biased below cut-off. So the signal as constituted for a particular digit representation is fed through conductors 42 and 43 to the input circuits of recording amplifiers 2 and 37. Amplifier 2 alone will respond to this signal because it alone is conditioned by the $R+G$ signal for delivering any output. Note that the R-pulses are carried through relay contact 34 and the front contact with which it is made by the G-signal.

Upon release of the key first selected an interval will elapse before a second key depression. During this interval relay 26 will not be operated and hence the G′-signal will be present. This conditions the recording amplifier 37 for Channel B to respond to any code signals which may be delivered to its input circuit. Amplifier 2 is at the same time disabled.

The G′-signal has a further effect in causing gate tube 41 to function for delivering the output from playback amplifier 38 (Channel A) to control grid $g_1$ in gate tube 40. Hence, the recording of the first digit in Channel A will be immediately effective to derive a readout of the same, the head 3 now serving for this pick-up purpose. Tube 40 responds to the gating operation of tube 41. The code signal is carried through conductor 42, contacts 33 and conductor 43 to amplifier 37, this amplifier being conditioned for response as per the preceding paragraph. The first digit then becomes stored in the same phase position along the two recording tracks A and B.

The next step is to set a key in the keyset 1 for recording the second digit of the number, reading from left to right. The operation so far as this recording is concerned is exactly the same as for recording the first digit. The code signal representing the second digit is applied to the same spots along Channel A as those which received the first digit. It supplants the same, since each of the four elements has one or the other of oppositely poled magnetization effects according as a "mark" or "space" significance is attached to it.

The erasure of the first digit recording from Channel A and substitution of the second digit recording is immediately followed during counting pulses $t_4$, $t_5$, $t_6$ and $t_7$ by a displaced transfer of the code signal (representing the first digit) from Channel B back to Channel A. The displacement is obtained to the extent of four elemental recording spots by means of the delay circuit 7. So Channel A now holds in storage a serially arranged recording of the first two digits of the number.

Subsequent keying operations may follow like the first two to the limit of the storage capacity for 4-unit code signals along each of the recording tracks. Each of the G-signal intervals results from a key depression and occasions the recording of a new digit on Channel A in positions fixed by the timing pulses $t_0$, $t_1$, $t_2$ and $t_3$. During these G-signal intervals also there follows a playback of all the information then stored on Channel B. This playback starts with pulse $t_4$ of the same cycle in which the first digit was entered, and may be repetitive in subsequent cycles depending upon how long the key is depressed.

During the interval of the G-signal a recording is made on Channel A first from the keyset, that is, in pulse times $t_0$, $t_1$, $t_2$, and $t_3$, and then from the playback by reading head 5 out of Channel B at pulse times $t_4$ to $t_n$, inclusive.

During the interval of the G′-signal a recording is made on Channel B of the playback by reading head 3 out of Channel A at pulse times $t_0$–$t_n$ inclusive and with no phase shift.

After the units digit of the number, or the furthest decimal digit thereof, has been recorded on Channel A, it will likewise be transferred to Channel B in the same manner as before but will not be retransmitted back to Channel A unless the zero key in keyset 1 should be set. This key delivers the G-signal without any accompanying code. In this case the full number would be recorded again in Channel A with an automatic recording of the code *space, space, space, space* to represent a zero in the units place. The significant digits previously keyed will then occupy the ordinal positions each one step retarded with respect to their previous positions, as would be expected.

A haphazardly timed key depression may coincide with a playback of only a part of a code signal combination during one revolution of the drum beginning at a time other than $t_0$. The remainder of the code signal will be recorded during the next revolution or complete cycle beginning at $t_0$. Reiteration of the recording will usually take place during subsequent revolutions as long as the key is held depressed. Also reiteration of the playback from one to the other of the recording channels will take place during the time interval between two successive manipulations of the keyset. So the lack of a uniform keying cadence is no drawback to the successful operation of our invention. What is accomplished, therefore, is to spread the pulse recordings along a magnetic recording channel with a uniform density of magnetized spots despite any irregularities of the keying incident to the human equation. The magnetic record so produced is of an ideal composition for playback at a definite cadence and for subsequent utilization in other departments of an electronic computer, or for indication of a computational result.

*Alternate precession arrangement*

Figure 4:
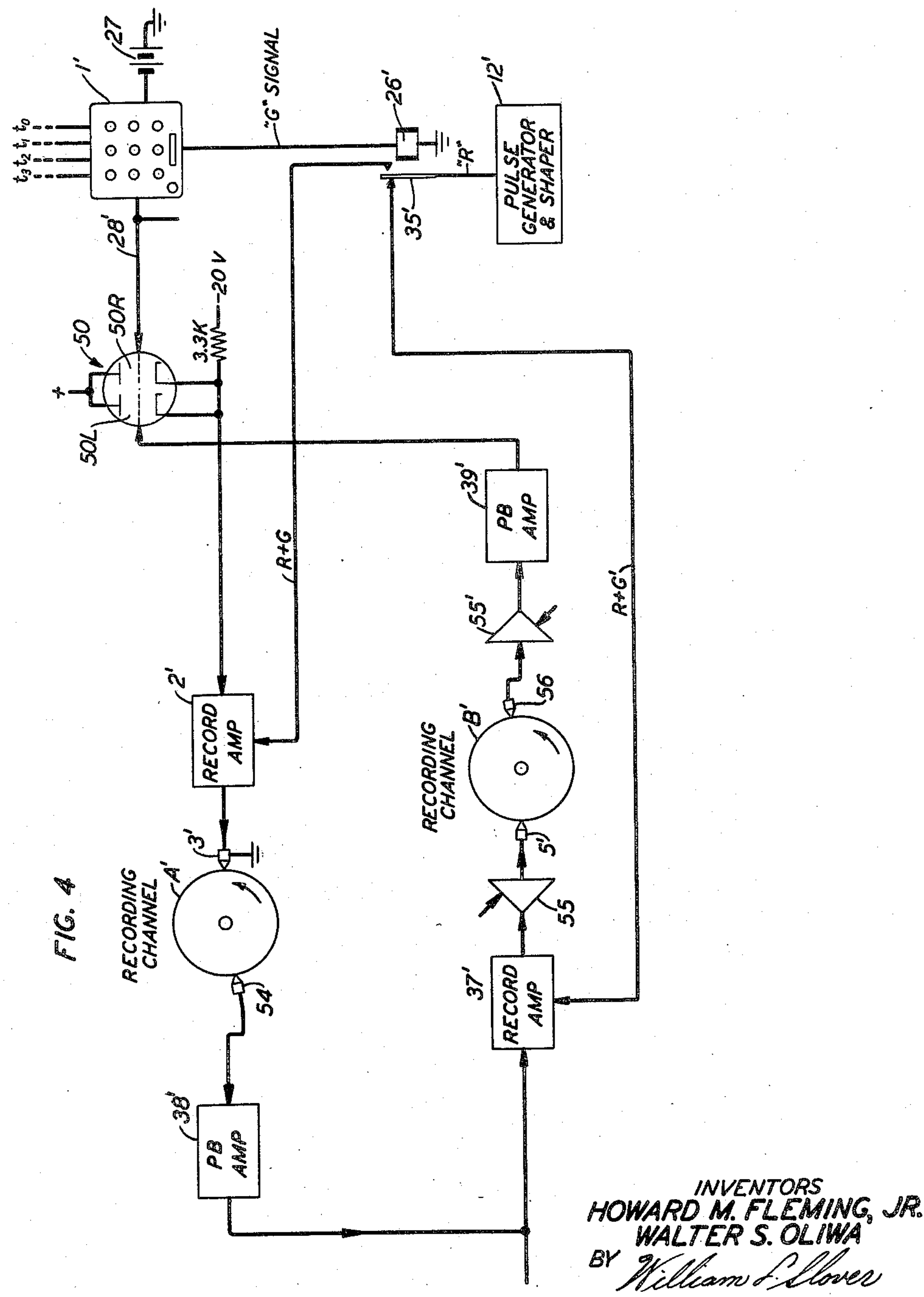
Fig. 4 is a schematic wiring diagram illustrating a modified form of the invention.

A modified precessing arrangement is shown in Fig. 4. This arrangement differs from that previously described in that it utilizes both a recording head and a playback head for each track of the recording drum, and also in that no electronic delay circuit such as circuit 7 of Fig. 1 is required. In describing this arrangement, it will be assumed that the pulses $t_0$, $t_1$, $t_2$ and $t_3$ are brought into the keyset the same as described above, and also that gate pulse relay 26' and pulse generator and shaper 12' operate in substantially the same manner as previously described.

Upon depression of a digit key of keyset 1', a G-signal is applied to relay 26' and the code signal representative of the depressed key is applied to the control grid of the right-hand side 50R of a gating tube 50 which normally has a −20 volt bias potential applied to its cathodes. In keeping with the arrangement described above, the signal pulses from keyset 1' each overcome said bias and cause conduction of section 50R of tube 50. The output of gating tube 50 is applied to a record amplifier 2' which may be identical with the record amplifiers 2 and 37 described above and which, like the former, effects recordings of both "mark" and "space" signals on a drum track A' by a recording head 3'. Record circuit 2' is also controlled by $R+G$ signals, the same as described above with reference to record circuit 2. When a digit key is depressed, a G-signal from the keyset energizes relay 26' causing transfer contact 35' to which R signals are transmitted from unit 12' to close with its back contact which is connected to one input of the record amplifier 2'. As a result, $R+G$ signals are transmitted to the record amplifier 2' and the latter applies "mark" or "space" signals to recording head 3' at times $t_0$, $t_1$, $t_2$ and $t_3$ in accordance with the code signals from the keyset.

Assuming, for example, that track A' embodies 180 time positions, and that a playback head 54 is located 92 time positions displaced from record head 3' in the direction of rotation of the drum, then a digital signal recorded on track A' at times $t_0$, $t_1$, $t_2$ and $t_3$ of a given cycle of the drum is played back by the playback head 54 at times $t_{92}$, $t_{93}$, $t_{94}$, and $t_{95}$ of the same cycle. Playback head 54 drives a playback amplifier 38' which is identical with playback amplifier 38 and whose output is applied to a record amplifier 37' associated with the record heads 5' for a series of tracks B' of the drum. Record amplifier 37' is also controlled by $R+G'$ signals in the manner set forth above in connection with record amplifier 37. The G'-signal, it will be remembered, is the inverse of the G-signal which is fed to record amplifier 2'. As a result, a G'-signal exists whenever all of the keys of keyset 1 are in normal restored positions. When the $R+G'$ signals are applied to record amplifier 37', the code signals from playback amplifier 38' are effective to operate said amplifier, and the latter energizes whichever recording head 5' is connected thereto by a selector circuit 55 of the sort described above in connection with record amplifier 37. The code signal is recorded on the appropriate track B' at times $t_{92}$, $t_{93}$, $t_{94}$, and $t_{95}$, that is, no delay is had between the playback of the information from track A' and the recording thereof on track B'. In those instances wherein the playback circuits are so designed that a delay is encountered therein, the effective delay between the recording and playback heads of a drum track is decreased. Located 92 time positions displaced from the record head 5' is a playback head 56. As a result, any number recorded on track B' at times $t_{92}$, $t_{93}$, $t_{94}$, and $t_{95}$ is played back at times $t_{184}$, $t_{185}$, $t_{186}$, and $t_{187}$. However, as previously mentioned, the recording tracks A' and B' have only 180 time positions. As a result, times $t_{184}$, $t_{185}$, $t_{186}$, and $t_{187}$ are actually times $t_4$, $t_5$, $t_6$, and $t_7$ of the next following cycle. The code signals played back by playback head 56 are transmitted through a selector circuit 55' to a playback amplifier 39'. The output signals from playback amplifier 39' are fed to the control grid of the left-hand side 50L of gating tube 50 and as a result, also cause said tube to conduct. However, such conduction is ineffective to operate record amplifier 2' without the coincident application to the latter of $R+G$ signals which, of course, do not occur until the next depression of a key of keyset 1'. When a second digit key of keyset 1' is depressed, the code output from the keyset effects conduction of the right-hand section 50R of gating tube 50 and the second digit is recorded on track A' at times $t_0$, $t_1$, $t_2$, and $t_3$, the same as described above with reference to the first digit. The first digit which, it will be remembered, was recorded on track B' in position to be played back at times $t_4$–$t_7$, is played back at said times and effects conduction of the left-hand section 50L of gating tube 50. This time the output of tube 50 in response to said playback is effective to operate record amplifier 2' and said first digit is recorded on track A' at times $t_4$–$t_7$.

It will readily be seen, therefore, that the 92 pulse time delay provided by track A' and the 92 pulse time delay provided by track B' combine to provide the 4 pulse time delay which is necessary in serially recording coded binary digits. Further depression of the keys of keyset 1' effects recording of the appropriate code signals on track A' at times $t_0$, $t_1$, $t_2$, and $t_3$, the previously recorded signals being precessed 4 pulse times for each key depression to provide room for the digit being entered thereby.

It is evident, therefore, that with this modified precessing arrangement, code signals are recorded on track A' while any key of keyset 1' is held depressed and on track B' when all keys are in normal restored positions.

It is to be mentioned that any suitable clearing means may be provided for the modified precession arrangement of Fig. 4. For example, the clear key 31 of Fig. 1 can be arranged to open the connection between playback amplifier 39' for track B' and the record amplifier 2' for track A' and to close connections between the latter and a source of negative potential and also the source of "R" pulses, whereby a full series of zeros are recorded on track A′. These zeros are, of course, shifted to track B′ as soon as the clear key is restored.

A feature of our invention which gives it great flexibility of operating speed is this—individual items or code signals may be recorded at any rate up to a limit as defined by the cyclic speed of the drum. The keyboard operator is not held to any particular cadence of fingering the keyboard. In practice, the drum will spin through several, possibly many, revolutions during the period of a single key depression, and also during an intervening period between key depressions. Furthermore, a drum recording may be made of information derived from any source regardless of the cadence of injection of the items, provided the cadence limit as determined by the drum speed is not exceeded. In other words, the rate at which a succession of data items is made available for a new recording is practically independent of the pulse frequency used for gating the information into the new recording channel.

The precessing arrangements described above are useful for purposes other than the serial entry of digits into a computer or the like. For example:

In the divider section of a computer means are required for accepting quotient digits one at a time, as they are formed, and for delivering the complete quotient to a readout device. To this end the quotient forming device may replace the keyboard in either of the arrangements described above and a suitably gated output line may be connected from the appropriate point of the precession circuit to the readout device.

In the multiplier section of a computer, means are required for delivering multiplier digits to the calculating means seriatim in the proper sequence. To this end, an entire multiplier may be transmitted to either precession arrangement described above and the latter so controlled as continuously to precess the same. Thus, a suitably gated output from the precession circuit will have a multiplier digit transmitted thereto on each cycle. Said output, of course, is connected to said calculating means.

It was previously stated that this recording and storage system is capable of modification so as to accommodate the storage of signals having other than numerical significance. Such modification can readily be made by those skilled in the art without the exercise of invention. All that is involved is to provide a different significance, such as alphabetical, for the code signals, and to provide more elements if necessary in each code signal. If a five unit code were to be adopted, for example, then the delay circuit 7 would be designed to obtain a displaced transfer record on Channel A in proper sequence to the initial recording.

Various other modifications and adaptations of the invention to suit the same for different needs may well be considered as coming within the scope of the claims.

We claim:

1. In a system for recording statistical items on a constantly rotating magnetic drum, two recording-and-playback heads each suitably positioned with respect to the periphery of said drum to scan recording tracks thereon, a generator of synchronizing pulses synchronized with said drum, a multicircuit code-composing means for preparing statistical items to be recorded, a pulse counter and matrix combination adapted to separately channel certain of said synchronizing pulses through different circuits of said code-composing means, a first electronic gate operable to pass code signals from said means to a first one of said heads at times determined by said counter and matrix combination, switching means operable in conjunction with said code-composing means for restricting said signal passage to the first of said heads, two playback circuits each for effecting a transfer of records from one to the other of said recording tracks respectively, a second electronic gate having alternative controls the first of which is operable by the restoration to normal of said switching means and is effective to obtain a playback from said first head directly into the second head, a delay circuit, and means including the second of said alternative controls in the second gate, and operative when said switching means is again operated, for obtaining a playback from said second head through said delay circuit and into said first head.

2. The combination according to claim 1 and including means for completely erasing a previous record from said recording tracks before recording a new record.

3. A data recording and playback device comprising a constantly rotating magnetic drum, recording-and-playback heads for scanning different tracks about the periphery of said drum, an electrical pulse generator synchronized with said drum, a keyset having digit keys for composing code signals representative of different digits, timing pulse circuits under control of said generator and individual to differently timed pulses of a group which serves to locate the elemental spot recording of said code signals in a certain sector along one of said tracks, said timing pulse circuits being feeders to contacts which are permutatively closable by said keys, a conditioning circuit also closable by any one of said keys, gating means operable under concurrent control of said timing pulses and said conditioning circuit for effecting a code signal recording on a first one of said tracks and in said certain sector thereof, other gating means operable upon opening of said conditioning circuit for effecting a playback of the record from the first of said tracks and a recording of the same in a corresponding sector of the second of said tracks, and a delay circuit and further gating means operatively coupled thereto interposed between the record-and-playback head of the second track and the record-and-playback head of the first track for causing a sequence of code signals to be incrementally recorded on serially disposed sectors of the first track, the increments of such recording being in accordance with successive key selections on the keyset.

4. In an information storage system including a multichannel, rotating magnetic drum, wherein items of information are represented in coded form by the presence or absence of pulses in a selected number of pulse positions, the combination of recording means associated with a first channel, playback means for said channel, information input means synchronized with the drum and operative to transmit sequential signals representative of the respective pulse positions of an item of information to said recording means during a particular period of drum cycle, recording means associated with a second drum channel and controlled by said playback means, means operating when said input means is enabled to enable the first and disable the second said channel recording means, playback means for the second channel connected to the recording means for the first channel to operate the latter and means operated when said input means is disabled to disable the first and enable the second said channel recording means.

5. In an information storage system including a multichannel, rotating magnetic drum, wherein items of information are represented in coded form by the presence or absence of pulses in a selected number of pulse positions, the combination of recording means associated with a first channel, playback means for said channel, information input means synchronized with the drum and operative to transmit sequential signals representative of respective pulse positions of an item of information to said recording means during a particular period of drum cycle, recording means associated with a second drum channel and controlled by said playback means, means operated when said input means is enabled to enable the first and disable the second said channel recording means, playback means for the second channel connected to the recording means for the first channel, a delay circuit in the last said connection having an effective delay equal in time to the representations of an item of information in serial fashion, and means operated when said input means is disabled to disable the first and enable the second said channel recording means.

6. Apparatus for recording representations of successive items of information on a channel of a multichannel magnetic drum, wherein items of information are represented in coded form by the presence or absence of pulses in a selected number of pulse positions, including means for recording information in one channel, information input means synchronized with the drum operative for at least a complete drum cycle to transmit sequential signals representative of the respective pulse positions of an item of information to said recording means during a particular period of drum cycle, playback means for said channel, recording means for a second channel connected to and operated by said playback means, the said second channel recording means being disabled and the said first channel recording means being enabled while said input means is enabled, playback means for the second channel connected to the recording means for the first channel to operate the latter when the same is enabled, means operated when said input means is disabled to disable the first and enable the second said channel recording means and means effective to make the time delay between operations of the recording means for the first channel by said input means and by the playback means for the second channel asymmetrical with respect to drum cycles by a time factor equal to an information item recording time.

7. The combination according to claim 6 wherein said information input means includes a keyboard, a counter advanced under control of recordings on a control channel of said drum, a selector matrix for obtaining outputs from the counter at appropriate counts thereof, and code forming means operated selectively by said outputs in accordance with the setting of the keyboard.

8. The combination according to claim 6 wherein said second channel may be any one of a plurality of channels, and including selector circuit means for determining which of said channels is to be utilized.

9. The combination according to claim 6 wherein said information input means includes a randomly operable keyboard, a pulse generator triggered by synchronizing recordings on a control channel of the drum, there being such a recording for each recording position of a drum channel, a counter advanced by said pulse generator, a selection matrix for routing output pulses from the stages of said counter representative of said particular period of drum cycle, and code forming means set up by said keyboard to route the appropriate ones of said pulses to the recording means for the first said channel.

10. The combination of a magnetic drum having a plurality of information channels, a first control channel having a recording thereon in each recording position and a second control channel having a single reset recording therein, a counter advanced under control of the recordings in said first control channel and reset by the recording in the second, a selector matrix connected to the several stages of the counter to produce a series of signals representative of predetermined counts of the counter, code forming means operable to combine said signals differentially to represent information items, recording and playback means for at least a pair of said information channels cross connected, the playback means of each to the recording means of the other, one said recording means also being connected to said code forming means to receive the information item signals therefrom and means in said cross connection to delay rerecording of a first information item by said one recording means until a second item is initially recorded thereby under control of said code forming means.

11. The combination of a magnetic drum having a plurality of information channels, a first control channel having a recording thereon in each recording position and a second control channel having a single reset recording therein, a counter advanced under control of the recordings in said first control channel and reset by the recording in the second, a selector matrix connected to the several stages of the counter to produce a series of signals representative of predetermined counts of the counter, code forming means operable to combine said signals differentially to represent information items, recording and playback means for at least a pair of said information channels cross connected, the playback means of each to the recording means of the other, one said recording means also being connected to said code forming means to receive the information item signals therefrom and means in said cross connection to delay rerecording of the items previously recorded thereby until another item is initially recorded thereby under control of said code forming means.

12. The combination according to claim 11 wherein said delay means comprises an electronic delay line between said one recording means and the playback means for the other channel.

13. The combination according to claim 11 wherein said delay means comprises pole pieces for the recording and playback means for each channel positioned apart relative to one another angularly of the drum, the appropriate number of recording positions in excess of a submultiple of the entire number of such positions to equal when combined with that of the other channel, the number of positions required for each item.

References Cited in the file of this patent

UNITED STATES PATENTS

| | | |
|---|---|---|
| 2,279,018 | Wolfe | Apr. 7, 1942 |
| 2,549,071 | Dusek | Apr. 17, 1951 |
| 2,564,403 | May | Aug. 4, 1951 |
| 2,587,532 | Schmidt | Feb. 26, 1952 |
| 2,609,143 | Stibitz | Sept. 2, 1952 |
| 2,609,907 | Lynch | Sept. 9, 1952 |
| 2,614,169 | Cohen | Oct. 14, 1952 |
| 2,652,554 | Williams | Sept. 15, 1953 |
| 2,701,095 | Stibitz | Feb. 1, 1955 |

OTHER REFERENCES

Proc. of the IRE, "A Digital Computer for Scientific Applications," by C. F. West et al. (pages 1452 through 1460), December 1948.

Proc. of Nat'l Elec. Conference, vol. III, "Storage of Numbers on Magnetic Tape," by J. M. Coombs; pages 201–209, 1947.

Proc. of Inst. of Elec. Engrs., "Universal High Speed Digital Computers: A Magnetic Store," by Williams et al.; pages 94–106, April 1952.

Progress Report #2, The Computation Laboratory, Harvard University; pages II–5 through II–9; November 10, 1948.

Electronic Engineering, "A Magnetic Digital Storage System," by Booth (pages 234 through 238), July 1949.